US011140905B2

(12) United States Patent
Sergent

(10) Patent No.: US 11,140,905 B2
(45) Date of Patent: Oct. 12, 2021

(54) OVEN COOKING MODULE FOR BAKERY, DANISH PASTRY AND SIMILAR PRODUCTS AND LINEAR TUNNEL OVEN COMPRISING AT LEAST ONE SUCH MODULE

(71) Applicant: MECATHERM, Barembach (FR)

(72) Inventor: Olivier Sergent, Paris (FR)

(73) Assignee: MECATHERM, Barembach (FR)

( * ) Notice: Subject to any disclaimer, the term of this patent is extended or adjusted under 35 U.S.C. 154(b) by 232 days.

(21) Appl. No.: 16/336,881

(22) PCT Filed: Sep. 28, 2017

(86) PCT No.: PCT/FR2017/052637
§ 371 (c)(1),
(2) Date: Mar. 26, 2019

(87) PCT Pub. No.: WO2018/060628
PCT Pub. Date: Apr. 5, 2018

(65) Prior Publication Data
US 2019/0246649 A1    Aug. 15, 2019

(30) Foreign Application Priority Data
Sep. 30, 2016   (FR) .................... 16 59431

(51) Int. Cl.
*H05B 1/02* (2006.01)
*A21B 1/24* (2006.01)
(Continued)

(52) U.S. Cl.
CPC ............... *A21B 1/245* (2013.01); *A21B 1/40* (2013.01); *A21B 1/48* (2013.01)

(58) Field of Classification Search
CPC ............ A21B 1/24–28; A21B 1/33–36; A21B 1/42–48; H05B 1/0263
See application file for complete search history.

(56) References Cited

U.S. PATENT DOCUMENTS 4,591,333 A    5/1986   Henke
4,626,661 A    12/1986  Henke
(Continued)

FOREIGN PATENT DOCUMENTS

BE    535353 A     2/1955
DE    2150192 A1   5/1973
(Continued)

OTHER PUBLICATIONS

English translation of EP 1368595 to Sergent (Year: 2006).*

*Primary Examiner* — Michael A LaFlame, Jr.
(74) *Attorney, Agent, or Firm* — Craft Chu PLLC; Andrew W. Chu

(57) ABSTRACT

The cooking module for bakery products includes a cooking enclosure having an arched roof and a sole on which the products rest. The module is equipped at least with a heating mechanism in the roof. The heating mechanism includes a plenum in which a heat-transfer fluid circulates from an inlet and at least one outlet. The plenum includes a plurality of blowing orifices for blowing fluid into the enclosure. The module includes a device for blanking off the orifices, being movable between a position of blanking of the orifices and a position of opening same. There is a means for extracting the heat-transfer fluid passing through the plenum and/or blown into the enclosure.

16 Claims, 2 Drawing Sheets

(51) Int. Cl.
*A21B 1/42* (2006.01)
*A21B 1/40* (2006.01)
*A21B 1/48* (2006.01)

(56) References Cited

U.S. PATENT DOCUMENTS

| | | | | |
|---|---|---|---|---|
| 4,960,100 | A * | 10/1990 | Pellicane | A21B 1/245 |
| | | | | 126/21 A |
| 6,049,066 | A | 4/2000 | Wilson | |
| 8,536,493 | B1 * | 9/2013 | Wolfe | A21B 1/48 |
| | | | | 219/400 |
| 9,234,700 | B1 * | 1/2016 | Gaur | F27D 21/00 |
| 2003/0218058 | A1 * | 11/2003 | Shaw | B23K 1/012 |
| | | | | 228/230 |
| 2007/0137633 | A1 | 6/2007 | McFadden | |
| 2008/0245359 | A1 * | 10/2008 | Williamson | A21B 1/48 |
| | | | | 126/39 C |

FOREIGN PATENT DOCUMENTS

| | | |
|---|---|---|
| EP | 1368595 A1 | 12/2003 |
| WO | 02073093 A1 | 9/2002 |
| WO | 2005117593 A1 | 12/2005 |
| WO | 2014053745 A1 | 4/2014 |

* cited by examiner

OVEN COOKING MODULE FOR BAKERY, DANISH PASTRY AND SIMILAR PRODUCTS AND LINEAR TUNNEL OVEN COMPRISING AT LEAST ONE SUCH MODULE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a cooking module for bakery products, pastries and the like, including a cooking enclosure comprising an arched roof and a movable or static sole, on which said products rest, directly or indirectly, through an adapted cooking support such as a plate, a net, a baking mold or the like, said module being also equipped with heating means on the roof, the latter comprising a plenum, in which a heat-transfer fluid circulates from an inlet to at least one outlet.

The invention also relates to a baking oven for bakery products, pastries and the like comprising at least one such module.

The invention relates to the field of the baking ovens for bakery products, pastries and the like, of the type including a movable or static sole, on which rest, in the same plane, the products to be cooked or pre-cooked, either directly or through a plate, a net or a mold supporting or containing these products.

2. Description of Related Art Including Information Disclosed Under 37 CFR 1.97 and 37 CFR 1.98

There are different types of baking oven for bakery products, Viennese bread, pastry and the like, which meet the above description, among which we can essentially distinguish those with a fixed sole and those with a movable sole.

In brief, an oven with a fixed sole includes a cooking enclosure comprising essentially an inlet for both loading and unloading, through which the products can be placed on the sole in order to be removed therefrom in the cooked or pre-cooked state.

It should be noted that such ovens can be designed with one or more floors. In the latter case, the oven is in the form of a pile of several cooking enclosures each delimited by a sole and a roof and including at least one inlet for both loading and unloading.

Among the ovens with a movable sole, we distinguish the ovens with a drawer sole, which, while meeting the above description, include a sole likely to be removed from the cooking enclosure, so that the products to be cooked can be placed in or removed from the oven at the end of cooking.

Furthermore, known is an oven the sole of which is in the form of a moving conveyor belt with reversal of direction of movement depending on whether the products are successively placed on this belt for loading or extracted from the cooking enclosure to remove them from this belt for their unloading.

Also known are in particular the linear tunnel ovens for continuous cooking of the products, these ovens including at least one cooking enclosure extending horizontally between an inlet and an outlet for the products, and delimited by a roof and a sole, the latter being in the form of a movable belt.

As such, the movable belts can range from the "solid" belt, comprised of contiguous stone blades or metal plates articulated to each other in order to form, in the horizontal path, a solid and continuous stone or metal sole, to the other extreme, where this movable belt can include a very open mesh, in particular for the conveying of molds or plates forming heavy assemblies, where a powerful sole convection ensures good cooking performances.

The belt may also be in the form of a succession of plates so as to form a sole and on which rest the products to be cooked.

It should be noted, however, that such a linear tunnel oven may be multi-stage and, like above, include a superposition of tunnel-shaped cooking enclosures each delimited by a sole and a roof.

Anyway, such ovens according to the state of the art mentioned above include heating means on the roof as well as heating means in the sole.

Such heating means can be of two types: convection heating means or radiation heating means, knowing that, in the latter case, it is known to associate circulation means in the cooking enclosure.

The type of heating in the sole, either radiation or convection, will influence the composition of this sole, either in the form of a solid material or conversely highly perforated in order to promote the passing of the heat-transfer fluid through this sole when convection heating is desired.

The heating means on the roof are generally of the radiation heating type. Thus, at the level of this roof can be installed electrical resistors or a plenum through which passes, from an inlet to an outlet, a heat-transfer fluid, in order to permit this plenum to radiate onto the products to be cooked or pre-cooked.

As mentioned above, circulation means can be provided at the level of the cooking enclosure when the heating means in the sole and on the roof are essentially of the radiation type.

In the case of convective heating, means for circulating the heat-transfer fluid ensure the blowing of the latter into the cooking enclosure, in particular, through the permeable sole and its extraction from this cooking enclosure by means of adapted suction means.

Also known from U.S. Pat. No. 4,626,661 is an oven for food preparation with a plurality of air channels connected to a plenum and a fan for supplying a hot air flow through the plenum into the air ducts.

The air duct on the roof includes a plurality of blowing orifices blowing downwards onto products moving in the enclosure by means of a conveyor belt.

The blowing orifices on the roof can be closed by means of a cover plate made integral with the plate provided with said orifices. The making integral occurs by means of removable locking pins, by means of a nut-bolt assembly, preventing any movement of the cover plate relative to the plate including the orifices.

When it is desired that the orifices are opened again, it is necessary to open each of the locking means, which necessarily proves to be time-consuming and tedious.

This is also the drawback of the system described in Patent letter U.S. Pat. No. 4,591,333, in which a plate can cover air passage openings in order to cause cooking by radiation of the products, while preventing the air from leaving at some locations in the oven.

To this should be added that from patent letter EP 1 368 595 is also known a baking oven for bakery products, pastries and the like, of the tunnel-oven type, including a sole provided with convection heating means in the sole and a roof provided with heating means alternately by convection or radiation.

More accurately, in the roof extends a plenum, in which a heat-transfer fluid can be circulated from an inlet and an outlet in order to permit this roof to provide radiation heating in the cooking enclosure.

In addition, pipes, or sleeves, extending in the cooking enclosure, vertically pass through this roof. Through some of these sleeves the heat-transfer fluid can be blown into said enclosure in order to ensure convection heating.

A heating circuit including means for circulating heat-transfer fluid in the form of a fan, for example, means for heating this heat-transfer fluid, such as a gas boiler, circuits for circulating the heat-transfer fluid equipped with control valves permits, as the case may be:
- to bring the heat-transfer fluid under the permeable sole, and/or;
- to circulate this heat-transfer fluid in the plenum for radiation heating in the roof, and/or:
- to bring the heat-transfer fluid into an enclosure for blowing it into the cooking enclosure through the tubes passing through the plenum.

It should be noted that recycling ducts communicating with the second part of the sleeves permit to suck, through the fan, this heat-transfer fluid from the cooking enclosure and/or the plenum for its recirculation.

It is well understood that, though such an oven is capable of providing, on the roof, heating by radiation or by convection, even both simultaneously, it has the drawback of a complex design cumbersome in height.

Indeed, in order to ensure heating by convection, and supply with heat-transfer fluid the pipes passing through the plenum on the roof, above this plenum must necessarily extend an enclosure for supplying said pipes with heat-transfer fluid.

Furthermore, in order to ensure more or less efficient convective heating from the roof, many pipes must thus pass through this plenum, while creating inside the latter a resistance, and therefore a significant loss of load, to the circulation of the heat-transfer fluid in this plenum in case of heating by radiation. This is further emphasized by the fact that half of the tubes are intended to permit an evacuation of the air, finally resulting in a non-uniform heating and cooking of the products from the roof.

BRIEF SUMMARY OF THE INVENTION

The present invention is intended to cope with all these drawbacks while maintaining this possibility for the user to select between a convection and radiation heating mode on the roof and thus to adapt this heating mode as well as possible to the cooking constraints of the products to be cooked or pre-cooked.

To this end, the invention relates to a cooking module for bakery products, pastries and the like, including a cooking enclosure comprising a roof and a movable or static sole, on which said products rest, directly or indirectly, through a suitable cooking support, such as a plate, a net, a baking mold or the like, said module being also provided with heating means on the roof, the latter comprising a plenum, in which a heat-transfer fluid circulates from an inlet and at least an outlet, wherein the plenum comprises a plurality of orifices for blowing heat-transfer fluid into the cooking enclosure, said module comprising also:
- means for blanking off said movable blowing orifices between at least two positions, one for blanking off said blowing orifices, the other one for opening the latter;
- means for sucking the heat-transfer fluid passing through the plenum and/or blown into the cooking enclosure;
- eventually means for managing the suction of the heat-transfer fluid.

In particular, said blanking means consist of closing means being in the form of a plate, in which orifices are provided for according to an arrangement, which corresponds to the blowing orifices, so that, in the open position, these orifices are located in front of said blow blowing orifices for convective heating of the products and that, in the blanked off position, said orifices in the plate are offset with respect to said blowing orifices, said plate closing the latter and leading to radiation heating of said products.

The advantages resulting from the present invention consist in that through the plenum in the roof of the oven, or oven module, according to the invention, it is possible to select a radiation and/or convection heating mode by acting on simple means for blanking off the blowing orifices this plenum is provided with, or even on means for sucking heat-transfer fluid, according to the embodiment being chosen, as will become evident in the following detailed description.

In essence, the present invention permits to omit the distribution enclosure extending above the plenum, this enclosure being indispensable in the solution of the state of the art corresponding to patent letter EP 1 368 595.

The gain in height and in simplification of the design is substantial. This gain in height is of particular interest in the case of designing multi-stage ovens.

Further aims and advantages of the present invention will become evident from the following description relating to particular exemplary embodiments given by way of an indication and non-restrictively.

The understanding of this description will be facilitated when referring to the attached drawings.

DETAILED DESCRIPTION OF THE INVENTION

Figure 1:
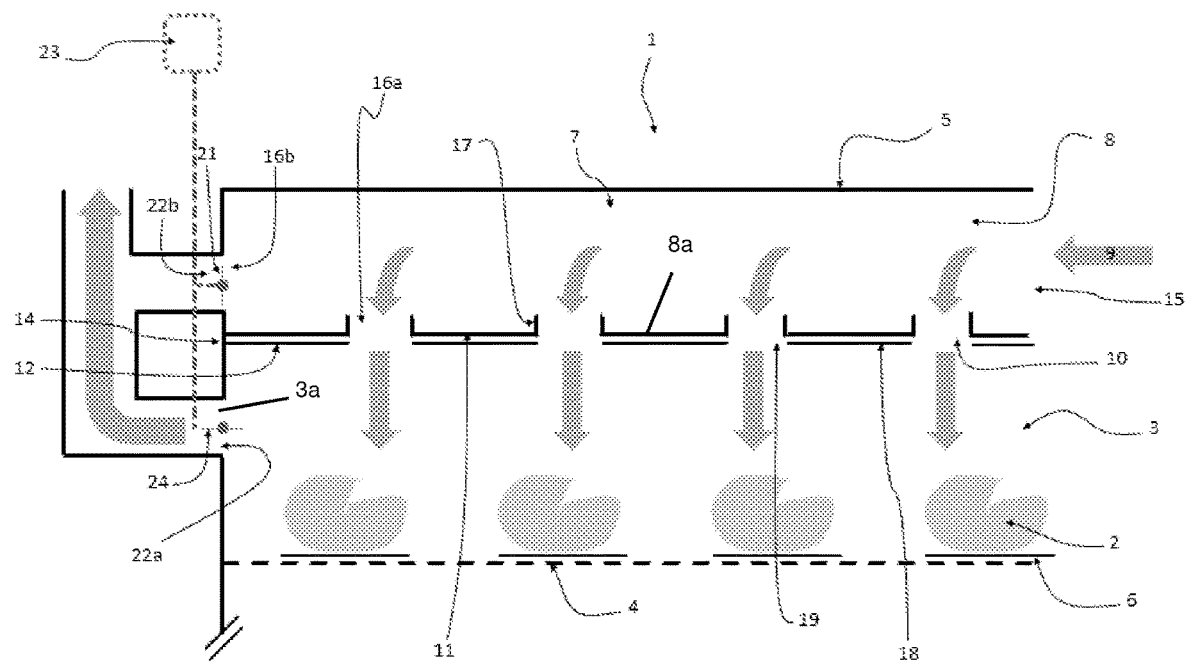
FIG. 1 is a schematic and cross-sectional view of a particular embodiment of a cooking module according to the invention, with the blanking means in the open position.

As shown in the figures of the attached drawings, the present invention relates to a cooking module 1 for bakery products 2, pastries or the like, including a cooking enclosure 3 delimited, in the lower portion, by a sole 4 and, in the upper portion, by a roof 5.

The sole 4 may be of the fixed or movable type and, in the latter case, said sole 4 may, for example, be in the form of a movable belt moving in a looped circuit between an inlet and an outlet, not visible in the figures, of the cooking module 1.

On this sole 4 rest, directly or indirectly, through a suitable support 6, such as a plate, a net, a mold or the like, the products 2.

Though such a cooking module 1 can be advantageously provided with heating means by radiation or by convection in the sole 4, it includes in any case, according to the invention, heating means 7 on the roof 5 comprising a plenum 8 extending preferably over the entire surface of the roof 5.

Inside this plenum 8 is circulated a heat-transfer fluid 9, represented by the gray arrows.

According to the invention, the plenum 8 includes a plenum plate 8a with a plurality of orifices for blowing 10 heat-transfer fluid 9 into the cooking enclosure 3 with an enclosure outlet 3a.

These blowing orifices 10 are therefore made at the level of the lower wall 11 of the plenum 8, towards this cooking enclosure 3.

Furthermore, this cooking module 1 according to the invention also comprises means for blanking off 12 these blowing orifices 10, which blanking means 12, being comprised of a blanking plate 18, are movable between at least two positions, one for blanking off 13 these blowing orifices 10 in a closed position, the other one for opening 14 these orifices 10 in an opened position.

Figure 2:
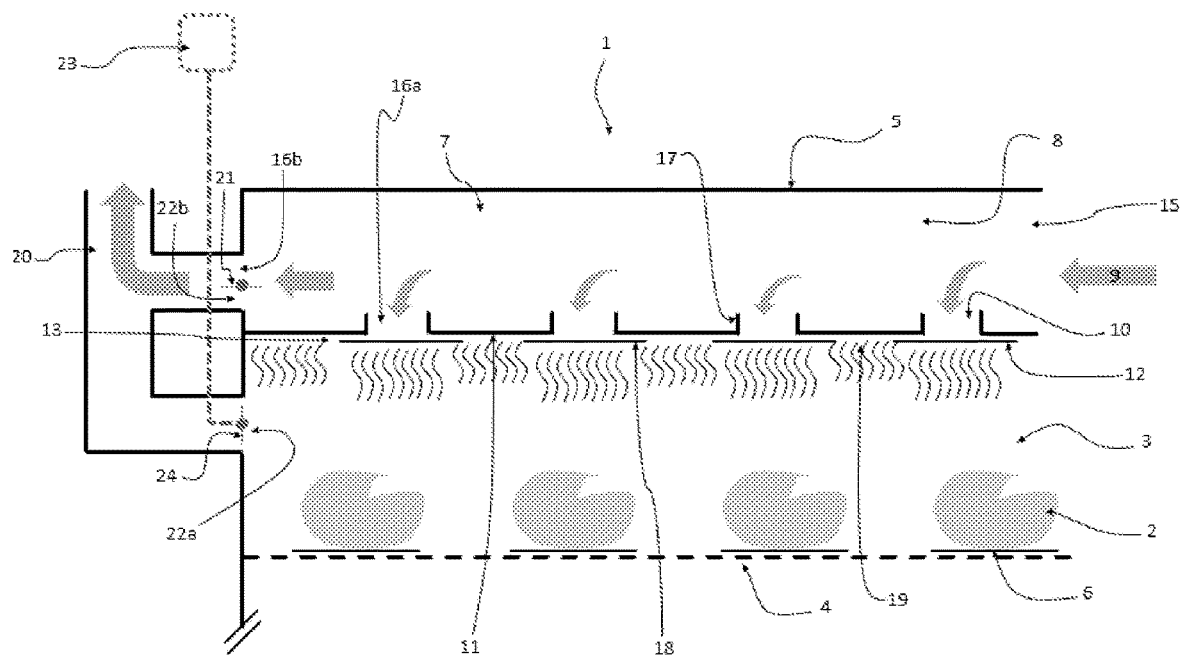
FIG. 2 is a schematic and cross-sectional view similar to that of FIG. 1 with the blanking means in the closed position.

The opened position 14 of the blanking means 12 is schematically shown in the attached FIG. 1, while the blanking position or closed position 13 of these same blanking means 12 is visible in FIG. 2.

In brief, when these blanking means 12 are in the blanking position 13, through the plenum 8 passes the heat-transfer fluid 9 from an inlet 15 to at least one outlet 16b or 16 (depending on the embodiment, as will become evident from the continuation of the description) so that this plenum 8 ensures heating essentially by radiation on the roof 5 of the cooking enclosure 3.

On the other hand, when said blanking means 12 are in the open position 14, the heat-transfer fluid 9 passes through the plenum 8 from the inlet 15 to the outlet 16a or 16 defined by the blowing orifices 10 in order to ensure convection heating of the products 2 to be cooked or pre-cooked from the roof 5.

It should be noted, by the way, that in the case of combined heating by radiation and convection said blanking means 12 may occupy an intermediate position between the blanking position 13 and the open position 14.

It should also be noted that, at the level of the blowing orifices 10, the latter can be provided with heat-transfer flow guides 17, which facilitate the guidance of the convective flow from the roof 5 towards said products 2.

In the following description, reference is made first to FIGS. 1 and 2 of the attached drawings corresponding to a first embodiment of the invention.

Within the framework of this exemplary embodiment according to the invention, the blanking means 12 are more particularly defined in the form of means for closing the blowing orifices 10.

According to an advantageous embodiment, these blanking means 12 are in the form of a plate 18, in which orifices 19 are formed according to an arrangement that matches the blowing orifices 10 so that, when said blanking means 12 are in the open position 14, shown in FIG. 1, these orifices 19 in the plate 18 are located in front of the blowing orifices 10 in order to ensure convective heating from the roof 5.

On the other hand, in the blanking position 13 of the blanking means 12, schematically shown in FIG. 2, the orifices 19 in the plate 18 are offset with respect to the blowing orifices 10, said plate 18 closing the latter and leading to radiation heating of the products 2.

It should be noted that, in such an embodiment in the form of means for closing the blanking means 12, the plenum 8 includes a fluid outlet 16b defined in the form of a suction mouth 22b, or a suction duct 22b, for the heat-transfer fluid 9 entering into the plenum 8 from the inlet 15.

The cooking module 1 includes means for closing 21 the outlet 16b for obliging the heat-transfer fluid 9 to pass through the blowing orifices 10, in the convective mode, when the blanking means 12 are in the open position 14, according to the illustration in FIG. 1.

Conversely, these means for closing 21 the outlet 16b are brought into the open position when in the radiation heating mode and the blanking means 12 are in the blanking position 13, as shown in FIG. 2.

In this embodiment, said cooking module 1 includes furthermore at least one suction duct (a first suction duct) 22a in the cooking enclosure 3 in order to permit the suction and recirculation of the heat-transfer fluid 9 blown from the roof 5 into the cooking enclosure 3 in convection heating mode, through the outlet 16a defined by the blowing orifices 10.

This suction duct 22a is also provided with closing means (first suction closing means, like a valve) 24, just like the suction duct (a second suction duct) 22b with a second suction closing means 21, like a valve.

Adapted management means 23, such as a switch or control module with firmware and logic programming, are provided in the cooking module 1 in communication with the closing means 24 of the suction duct 22a and the means for closing 21 the suction duct 22b of the plenum 8 for managing opening and closing through the cooking enclosure 3 and plenum 8.

These management means 23 ensure the recirculation of the heat-transfer fluid 9 simply passing through the plenum 8 in radiation mode, i.e. the blanking means 12 in the blanking position 13, or injected into the cooking enclosure 3 through the blowing orifices 10, which this plenum 8 includes, in the convective mode, i.e. the blanking means 12 in the open position 14.

In this respect, the cooking module 1 can be provided with means for recirculating the heat-transfer fluid 9 in the form of a fan or the like, in order to simultaneously suck this heat-transfer fluid 9 coming from the plenum 8 and/or the cooking enclosure 3 in order to send it to suitable heating means, such as burners, resistors or the like, and to push it back into the plenum 8.

Such recirculation means are known to those skilled in the art.

It should however be remembered that the management means 23 can modulate the heat-transfer fluid 9 being sucked through each of these suction ducts 22a, 22b, in the case of combined heating by radiation and convection, the closing means 24, 21, respectively, being both brought into an intermediate position between the closed position and the open position.

Figure 3:
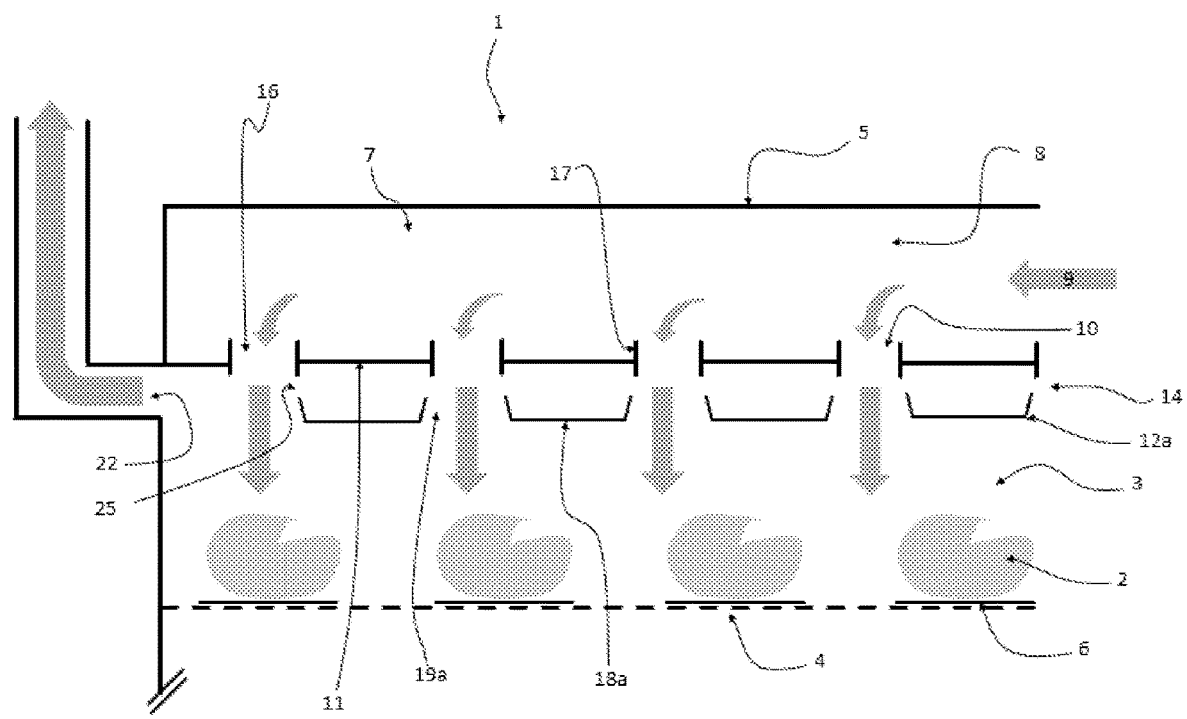
FIG. 3 is a schematic and cross-sectional view, similar to FIG. 1, i.e. with the blanking means in the open position, according to another embodiment of the invention.
Figure 4:
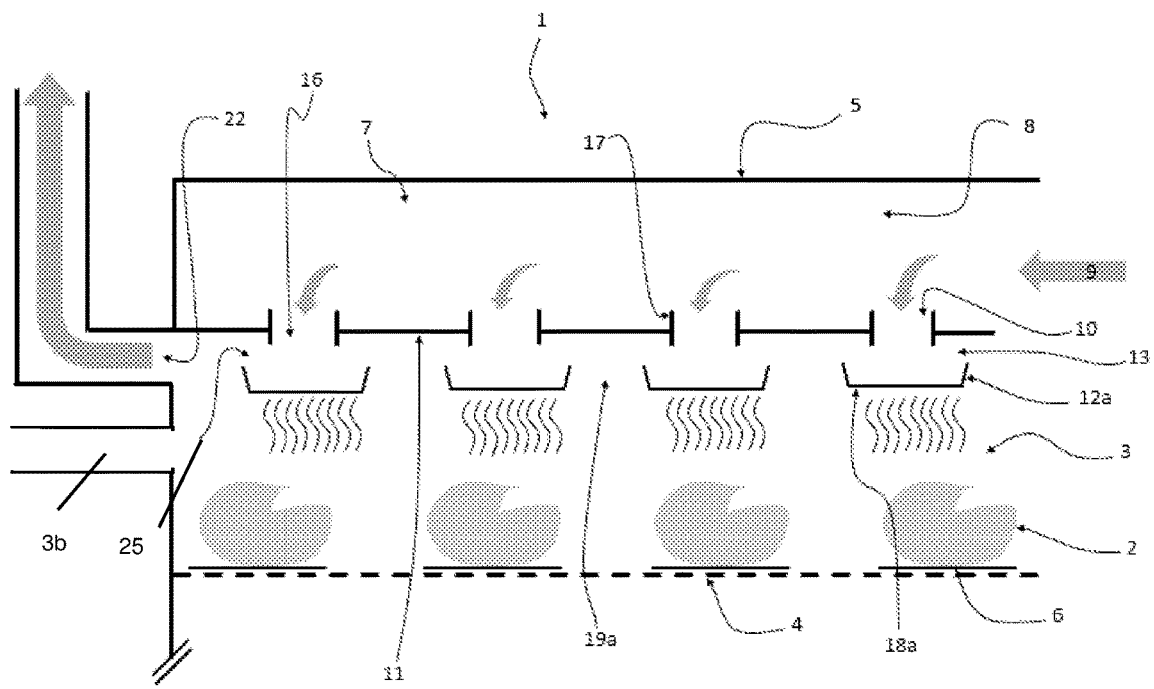
FIG. 4 is a schematic and cross-sectional view, similar to FIG. 3, with the blanking means in the closed position.

The embodiment shown in FIGS. 3 and 4 differs from the one just described, namely in that the blanking means 12 are, in the blanking position 13, in the form of a screen for deflecting 12a the flow of heat-transfer fluid 9 blown into the cooking enclosure 3 through the blowing orifices 10. They are shown in the open position 14 in FIG. 3 and in the blanking position 13 in FIG. 4.

In this embodiment, the outlet 16 of the heat-transfer fluid of the plenum 8 is formed by the orifices 10.

The blanking means in the form of a screen 12a are located under these orifices 10 and at some distance therefrom.

Finally, these blanking means 12a, in the occulting position 13, by forming a screen under the plenum 8 delimit with the latter a space 25, which a suction duct 22 communicates with, permitting the recirculation of the heat-transfer fluid 9 from blowing orifices 10 and blocked by the screen-like blanking means 12a.

Advantageously, since this suction duct 22 also communicates with the cooking enclosure 3, it contributes furthermore to the recirculation of the heat-transfer fluid 9 blown through the blowing orifices 10 into the cooking enclosure 3 when said blanking means 12a are in the open position 14, as shown more particularly in FIG. 3.

Turning back to said blanking means forming a screen 12a, they can, here too, be in the form of a plate 18a including, like in the previous embodiment, orifices 19a likely to match the blowing orifices 10 in the plenum 8.

Advantageously, the mouth of these orifices 19a in the plate 18a has a frustoconical shape so as, in the blanking position 13, to discharge the heat-transfer fluid 9 blown onto this plate 18a between these orifices 19a towards the plenum 8 and to avoid it from reaching the cooking enclosure 3.

In this position, shown in FIG. 4, this heat-transfer fluid 9 heating the plate 18a of the screen-like blanking means 12a contributes to heating the cooking enclosure 3 by radiation through said plate 18a.

FIG. 3 more particularly illustrates the plate 18a in the open position 14, the orifices 19a of the said plate 18a matching the blowing orifices 10 in the plenum 8.

Alternatively, when the blowing orifices 10 adopt an arrangement in transverse or longitudinal rows at the level of the plenum 8, the blanking means 12a forming a screen can be defined by blades adopting, more particularly, the shape of gutters with raised longitudinal edges.

The size and spacing of these blades are defined, as the case may be, in the blanking position 13 shown in FIG. 4, so as to extend under the rows of blowing orifices 10 in the plenum 8 or, on the contrary, in the opening position 14 visible in FIG. 3, so as to be interposed between these rows of blowing orifices 10 while preserving, under the latter, a slot through which the heat-transfer fluid 9 can be blown into the cooking enclosure 3.

Like for the frustoconical openings, the raised edges of these blades are intended, in the blanking position 13 of the blanking means forming a screen 12a, to discharge the heat-transfer fluid 9 into the space 25.

The aim is to obtain a heating on the roof 5 essentially by radiation of said blades in the cooking enclosure 3, in the blanking position 13.

Advantageously, as mentioned above, the blowing orifices 10 may be provided with heat-transfer fluid flow guides 17.

These guides 17, in the form of tube lengths, can extend into the plenum 8 in the case of blanking means 12 defining means for closing the blowing orifices 10 according to the first embodiment described, with reference to FIGS. 1 and 2 of the attached drawings.

On the contrary, these tube lengths defining the heat-transfer fluid guides 17 can extend totally or partially under the plenum 8 in the case of blanking means forming a screen 12a.

FIGS. 3 and 4 schematically show the heat-transfer fluid guides 17 in the form of tube lengths extending partially in the plenum 8 and partially under the plenum 8.

This second solution has the advantage of a lower pressure drop of the heat-transfer fluid 9 passing through the plenum 8.

It should be noted that such heat-transfer fluid guides 17 promote the heat exchange with the lower wall 11 of the plenum 8, which is provided therewith, for a better performance of the radiation heating.

There has been described, with reference to FIGS. 3 and 4, an embodiment of the module 1 including only one duct for sucking 22 the heat-transfer fluid communicating with the cooking enclosure 3 of the module, but also with the space 25 between the plenum 8 and the blanking means forming a screen 12a.

However, such an embodiment is not restrictive and, like in the embodiment described with reference to FIGS. 1 and 2, it is possible to consider two suction ducts, each provided with respective closing means, one (another enclosure outlet 3b) of the conduits communicating with the cooking enclosure 3 and the other one (enclosure outlet 3a) communicating with the space 25 between the plenum 8 and the blanking means forming a screen 12a.

In the latter case, the module 1 also comprises means for managing the suction of the heat-transfer fluid 9 acting on said means for closing said ducts, in order, as the case may be, to:
  close the suction duct communicating with the space 25 between the plate forming a screen 18a and the plenum 8 when the blanking means 12a are in the open position 14 and open the suction duct communicating with the cooking enclosure 3 in the case of convection heating from the roof 5;
  on the other hand, open the suction duct communicating with the space 25 between the plate forming a screen 18a and the plenum 8 when the blanking means 12a are in the blanking position 13 and close the suction duct communicating with the cooking enclosure 3 in the case of radiation heating from the roof 5.

It should however be remembered that, like for the first embodiment that has been described, these management means can modulate the heat-transfer fluid sucked through each of these suction ducts, in the case of a combined heating by radiation and convection, the closing means being brought into an intermediate position between the closed position and the open position.

The present invention also relates to an oven including at least one module 1 according to the invention.

Preferably, the oven is of linear tunnel oven type including several juxtaposed modules 1 through which passes a sole 4 in the form of a movable belt.

Thus, at the level of each module 1 can be selected a heating, as the case may be, by radiation, by convection, or mixed radiation/convection, so as to best adjust this heating to the required cooking conditions for the products 2 during their passing through the oven.

I claim:

1. A cooking module for bakery products, comprising:
   a roof;
   a cooking support opposite said roof;
   a sole resting on said cooking support;
   a heating means being comprised of a plenum between said roof and said sole,
   wherein said plenum is comprised of a plenum plate with a plurality of blowing orifices so as to form a cooking enclosure between said plenum and said cooking support, said sole being within said cooking enclosure,
   a means for blanking said blowing orifices being comprised of a blanking plate with a plurality of orifices,
   wherein said plenum is further comprised of:
      an inlet;
      a first outlet through said blowing orifices; and
      a second outlet opposite said inlet,
   wherein said cooking enclosure is comprised of an enclosure outlet in fluid connection with said first outlet and said second outlet,
   wherein said blanking plate has an opened position with said orifices aligned with said blowing orifices of said plenum plate so as to circulate heat transfer fluid from said inlet, through said blowing orifices, through said orifices for convective heating said cooking enclosure, and through said enclosure outlet,
   wherein said blanking plate has a closed position with said blowing orifices offset from said orifices of said blanking plate for radiation heating said cooking enclosure through said plenum plate and said blanking plate, and
   wherein said blanking plate has an intermediate position between said opened position and said closed position for convective heating and radiation heating said cooking enclosure; and
      a means for sucking in fluid connection with said inlet, wherein said means for sucking is comprised of:
         a first suction duct with a first suction closing means connected to said enclosure outlet;
         a second suction duct with a second suction closing means connected to said second outlet.

2. The cooking module, according to claim 1, wherein said blanking plate is comprised of a screen so as to circulate said heat transfer fluid in said opened position and to deflect said heat transfer fluid in said closed position.

3. The cooking module, according to claim 2, wherein said blanking plate is in said closed position, said first suction duct being closed, and said second suction duct being opened so as to circulate said heat transfer fluid from said inlet, through said blowing orifices, and into a space between said blanking plate and said blowing orifices, for radiation heating from said blanking plate.

4. The cooking module, according to claim 3, wherein said orifices of said screen have frustoconical shapes.

5. The cooking module, according to claim 2, wherein said screen is comprised of blades, said plurality of orifices being comprised of rows between said blades.

6. The cooking module, according to claim 1, wherein said blowing orifices are comprised of guides, each guide being comprised of a tube length extending across said plenum plate.

7. The cooking module, according to claim 1, further comprising:
   a management means in communication with said first suction closing means and said second suction closing means.

8. An oven, comprising:
   a cooking module, according to claim 1.

9. A linear cooking tunnel, comprising:
   a plurality of cooking modules, said plurality of cooking modules being comprised of a cooking module according to claim 1.

10. A cooking module for bakery products, comprising:
    a roof;
    a cooking support opposite said roof;
    a sole resting on said cooking support;
    a heating means being comprised of a plenum between said roof and said sole,
    wherein said plenum is comprised of a plenum plate with a plurality of blowing orifices so as to form a cooking enclosure between said plenum and said cooking support, said sole being within said cooking enclosure,
    a means for blanking said blowing orifices being comprised of a blanking plate with a plurality of orifices,
    wherein said blanking plate has an opened position with said orifices aligned with said blowing orifices of said plenum plate so as to circulate heat transfer fluid from said plenum to said cooking enclosure for convective heating,
    wherein said blanking plate has a closed position with said blowing orifices offset from said orifices of said blanking plate for radiation heating said cooking enclosure through said plenum plate and said blanking plate, and
    wherein said blanking plate has an intermediate position between said opened position and said closed position for convective heating and radiation heating said cooking enclosure; and
    wherein said plenum is further comprised of:
       an inlet; and
       a first outlet through said blowing orifices,
    wherein said cooking enclosure is comprised of an enclosure outlet in fluid connection with said first outlet,
    a means for sucking in fluid connection with said inlet,
    wherein said means for sucking is comprised of a first suction duct with a first suction closing means connected to said enclosure outlet,
    wherein said blanking plate is comprised of a screen so as to circulate said heat transfer fluid in said opened position and to deflect said heat transfer fluid in said closed position,
    wherein said blanking plate is in said closed position, said first suction duct being opened so as to circulate said heat transfer fluid from said inlet, through said blowing orifices, and into a space between said blanking plate and said blowing orifices, for radiation heating from said blanking plate.

11. The cooking module, according to claim 10, wherein said orifices of said blanking plate have frustoconical shapes.

12. The cooking module, according to claim 10, wherein said screen is comprised of blades, said plurality of orifices being comprised of rows between said blades.

13. The cooking module, according to claim 10, wherein said blowing orifices are comprised of guides, each guide being comprised of a tube length extending across said plenum plate.

14. The cooking module, according to claim 10, wherein said space between said blanking plate and said blowing orifices is in fluid connection with said enclosure outlet.

15. The cooking module, according to claim 14, wherein said cooking enclosure is further comprised of another enclosure outlet in fluid connection with said first outlet.

16. The cooking module, according to claim 15, wherein said blanking plate is in said opened position, said first suction duct being closed, said another enclosure outlet being opened for convection heating.

\* \* \* \* \*